June 6, 1961 E. J. HERBENAR 2,986,955
FLUID MECHANICAL COUPLING
Filed Dec. 8, 1958 4 Sheets-Sheet 2

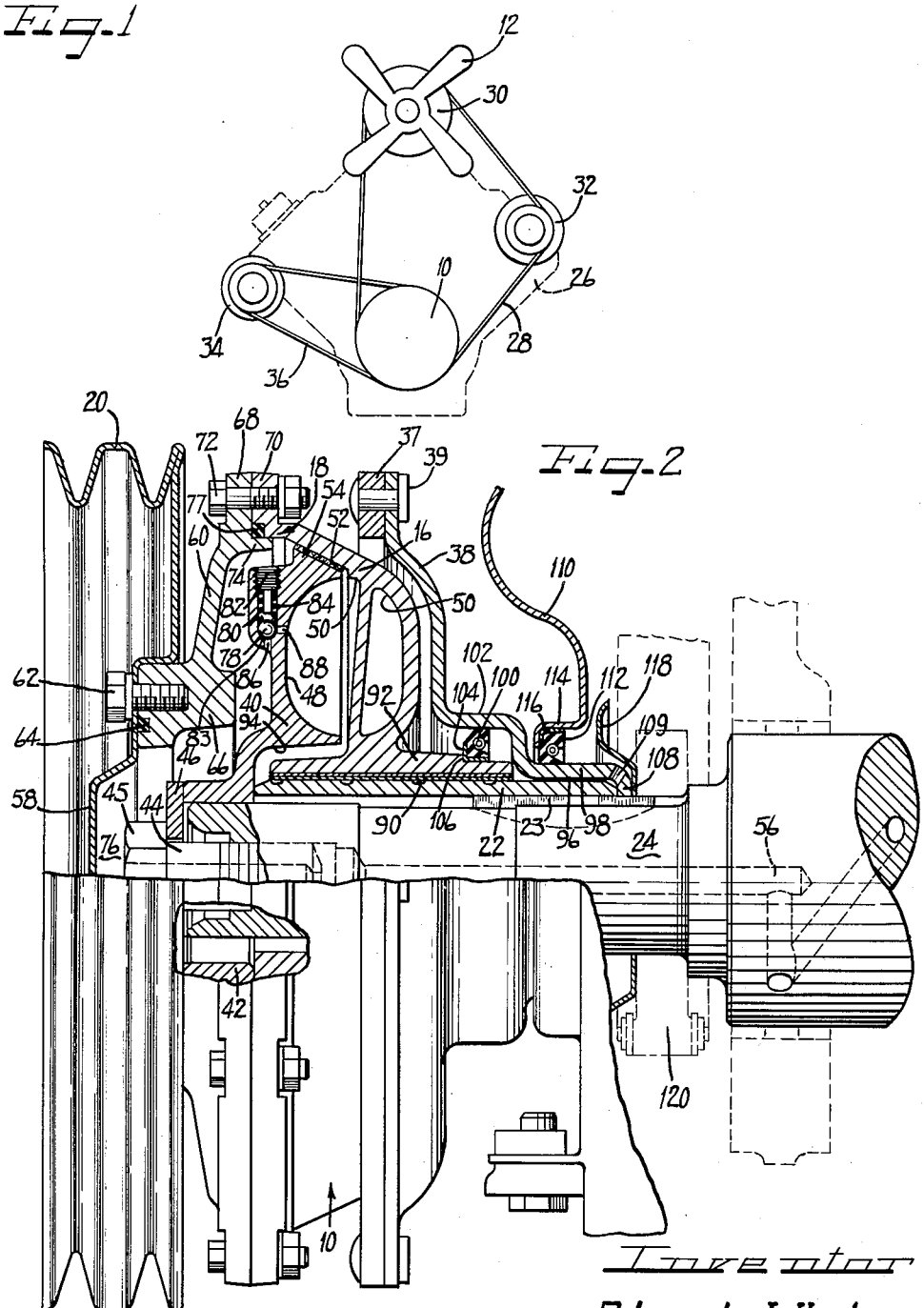

Inventor
Edward J. Herbenar
By Hill, Sherman, Meroni, Gross & Simpson Attys

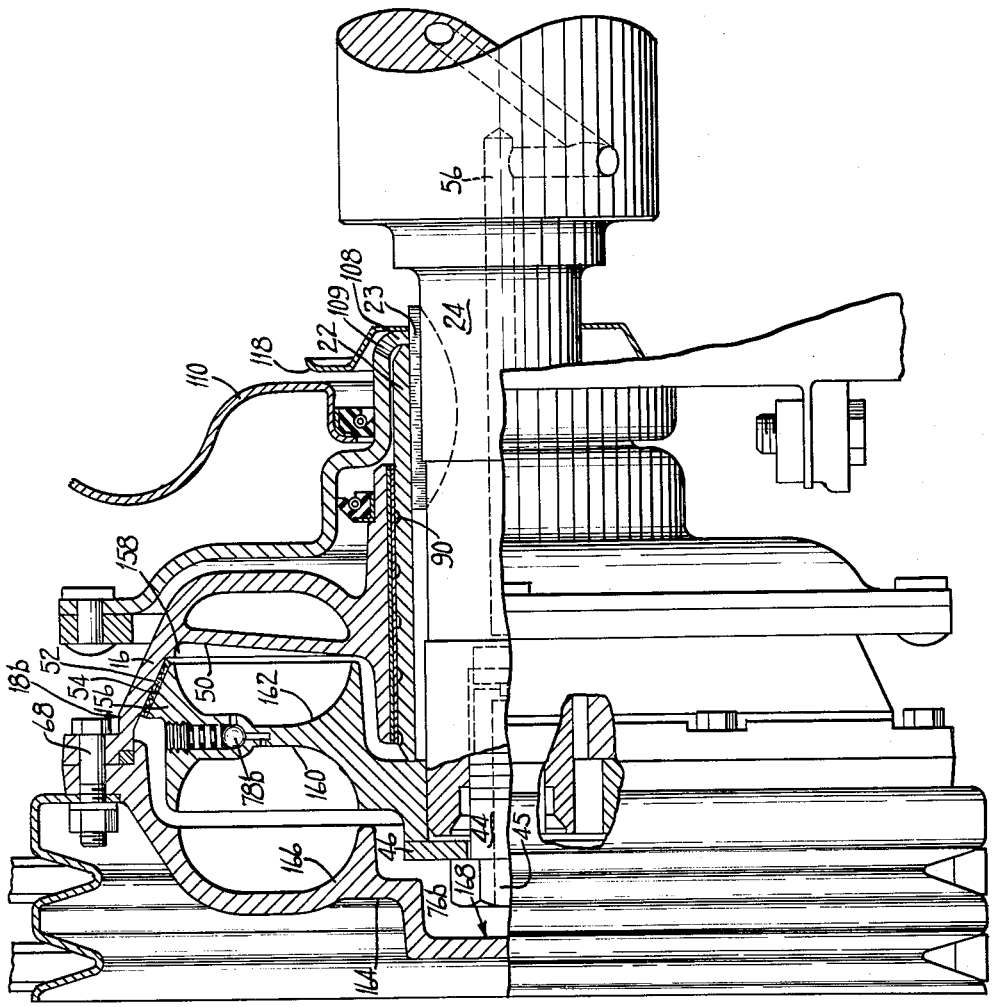

June 6, 1961 E. J. HERBENAR 2,986,955
FLUID MECHANICAL COUPLING
Filed Dec. 8, 1958 4 Sheets-Sheet 4
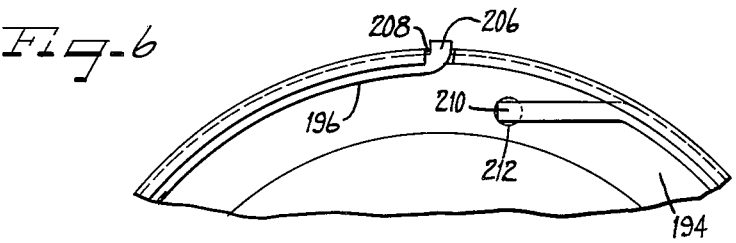
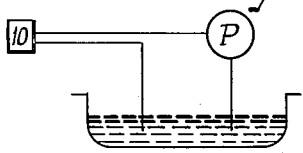
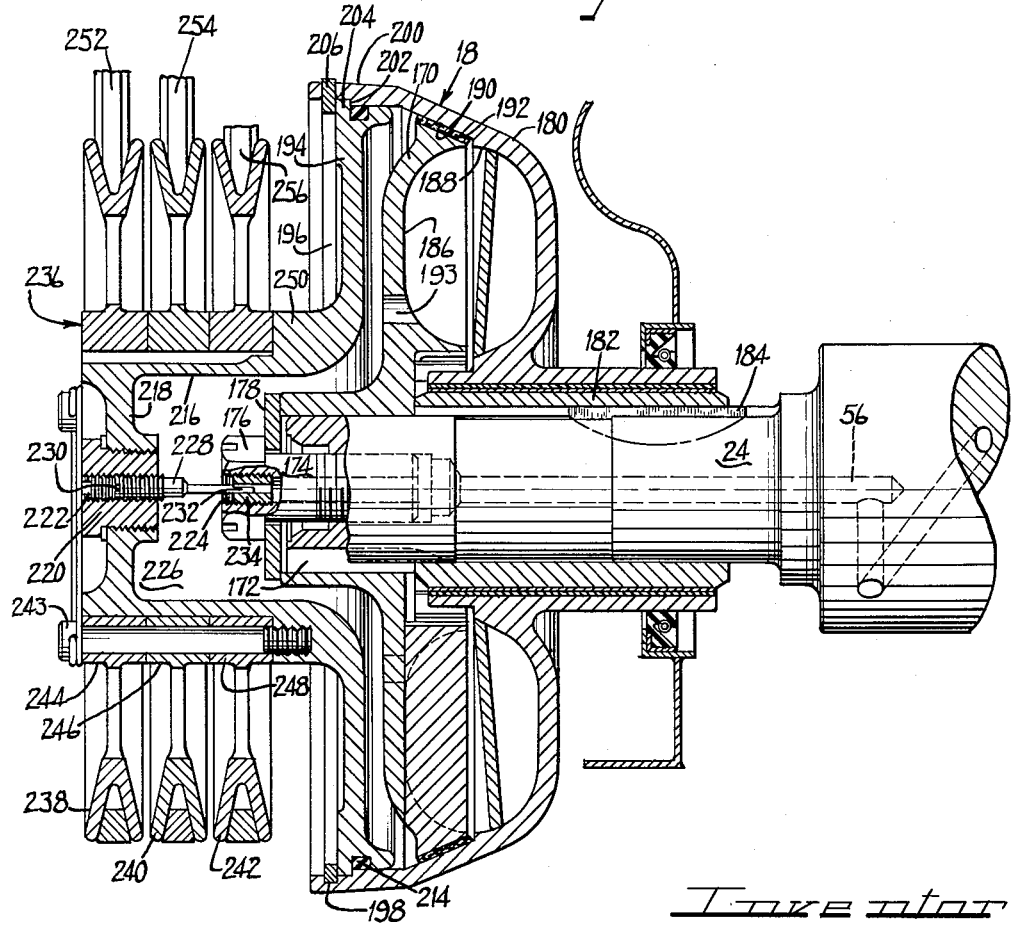
Inventor
Edward J. Herbenar

United States Patent Office 2,986,955
Patented June 6, 1961

2,986,955
FLUID MECHANICAL COUPLING
Edward J. Herbenar, Detroit, Mich., assignor to Thompson Ramo Wooldridge Inc., Cleveland, Ohio, a corporation of Ohio
Filed Dec. 8, 1958, Ser. No. 778,987
14 Claims. (Cl. 74—574)

This invention relates to a fluid and mechanical coupling adapted to drive accessories such as an automobile fan or the like and more particularly to a coupling which will permit driving accessories at a suitable speed when the engine is running relatively slowly while preventing excessive speed and torque from being applied to the accessories at high engine speeds.

In driving automobile accessories from the crank shaft or the like, high engine speeds may occasion considerable damage to the accessories and may reduce engine efficiency because of unnecessarily high accessory loads. At the same time, it is desirable to have a sufficient torque for driving the accessories to maintain their operation even at low engine speeds. The present invention provides a fluid and mechanical coupling which is operatively connected with a source of fluid pressure, such as the oil pump or engine oil pressure line of an internal combustion engine, and is adapted to achieve the foregoing objectives. Control of the torque-carrying ability of the coupling is afforded by speed responsive means including inlet and outlet bleed orifices in an accessory impeller and turbine respectively, the turbine being fixedly secured to a housing carrying a pulley means. Rotation of the turbine at relatively low engine speeds is primarily afforded by a wet friction clutch effected by a pressure differential between the housing and the impeller, while higher engine speeds produce a load on the wet friction clutch such as to cause it to disengage and maintain a fluid coupling between the turbine and impeller. The turbine and impeller rotate at different speeds during the fluid clutch engagement thereof so that a pumping action is provided which further reduces pressure in the fluid clutch and prevents undesirably high torques from being applied to the accessories.

Fuid is introduced through the engine crankshaft and a reduced outlet flow from the coupling is provided by means of a helical flow path leading to the engine crankcase or other receiving means which releases an amount of fluid such as to maintain a pressure in the fluid coupling at all speeds of engine operation. This helical path is provided by a sleeve around the crankshaft which affords a wiping and pumping action during relatively high speed operation of the engine such as to cause disengagement of the mechanical or friction clutch and a consequent differential in speed between the impeller and the trubine. In one embodiment, the invention provides for control of the relative speed between the turbine and the impeller by means of a metering valve on the housing cooperating with pulley means biasing the mechanical clutch to disengaged relationship. The metering valve includes a needle element extending axially into the fluid inlet passage in the crankshaft so that as the coupling is moved to disengaged position, the needle element is moved into the crankshaft passage to reduce the flow at high engine speeds.

In driving accessories which require a relatively high torque, or where a plurality of accessories are driven from the pulley on the housing of the coupling of the invention, it is desirable to maintain a differential speed between the turbine and impeller at high engine speeds while providing a substantial torque to operate the accessories. The invention accomplishes this purpose, in one embodiment thereof, by means of a double-faced turbine and a coacting complementary double-faced impeller.

The coupling of the invention may also be used with a balancing plate for the engine which may be disposed either on the inner engine side of the coupling, where it may be used for location of ignition timing marks, or on the outer side of the coupling, in which case suitable sealing means are provided for the coupling.

Accordingly, it is an object of the present invention to provide a fluid-mechanical coupling which is adapted to drive accessories for a vehicle or the like by mechanical clutch means at relatively low engine speeds and by fluid clutch means at relatively higher engine speeds, including means for pumping the fluid from the clutch during fluid clutch operation which are also effective to afford a wiping action between the respective parts.

Another object of the invention is to provide a clutch as described which is adapted to drive accessories requiring a relatively high torque, and which is characterized by a double-faced turbine and double-faced impeller for this purpose.

Another object of the invention is to provide an embodiment of a clutch as described having a metering valve for reducing flow and pressure in the coupling during relatively high engine speeds so that excessive torque is not developed through the coupling.

Yet another object of the invention is to provide a clutch as described in combination with engine balancing wheel means which may be disposed either adjacent the engine for location of engine timing marks or on the side of the clutch facing away from the engine.

Other objects and advantages of the invention will become apparent as the description proceeds in accordance with the drawings, in which:

FIGURE 1 is a front view of the coupling in association with engine accessory pulleys adapted to be driven thereby;

FIGURE 2 is a side view partly in vertical section of a coupling according to the present invention;

FIGURE 4 is a side view partly in vertical section of yet anoter embodiment of the invention;

FIGURE 5 is a vertical sectional view of a coupling according to the invention having metering means for reducing torque at high speed operation;

FIGURE 6 is a fragmentary plan view of the coupling of FIGURE 5 showing fastening means for a housing plate thereof; and FIGURE 7 is a schematic showing of a fluid flow circuit for the coupling of the invention.

Figure 3:
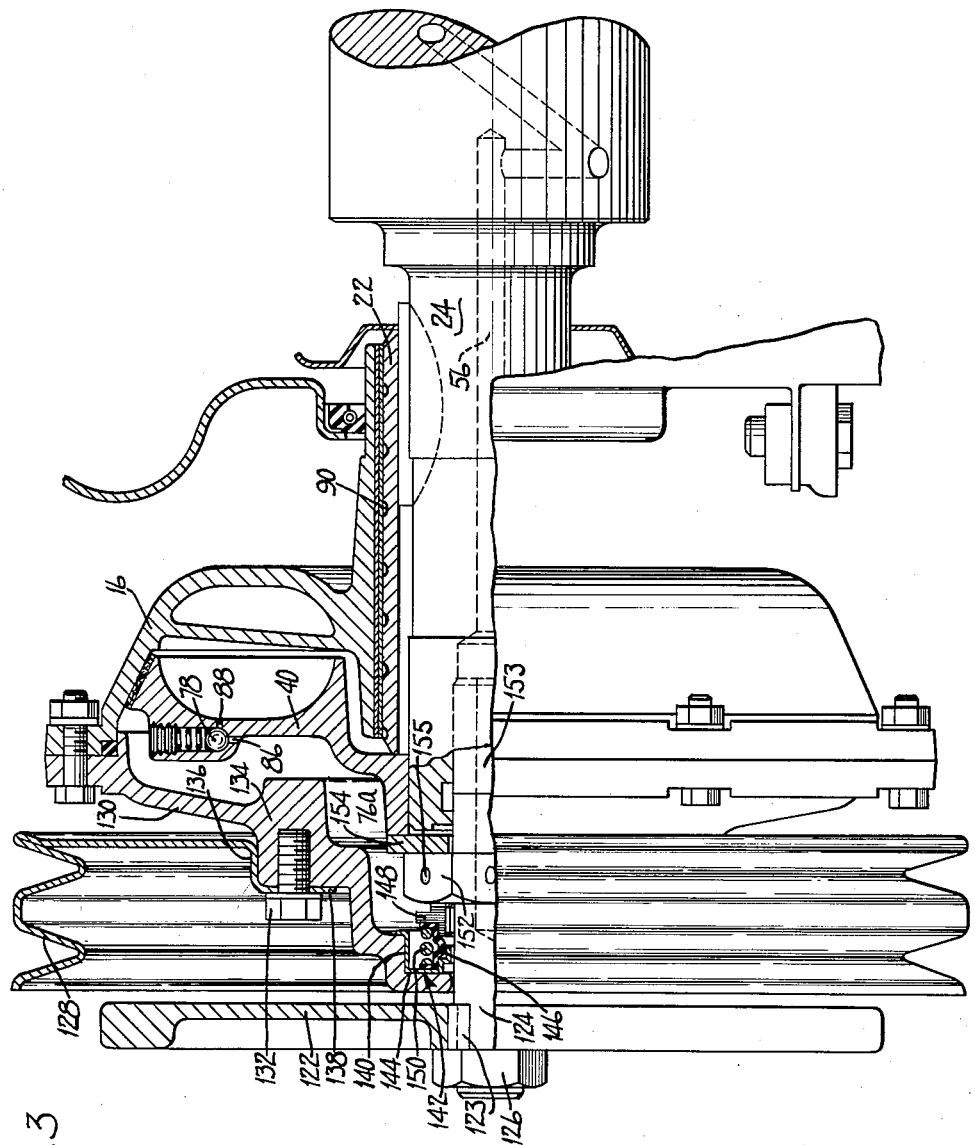
FIGURE 3 is a side view partly in vertical section of another embodiment of the invention.

Referring now to FIGURES 1 and 2, a coupling 10 is shown in accordance with the invention for driving a fan 12, it being understood that other accessories may be driven thereby in accordance with the scope of the invention. The coupling includes a rotor or turbine 16 defined in a housing 18 which carries a pulley 20, the turbine being slidably journalled on a sleeve 22 which is fixedly secured by a key 23 upon a crankshaft 24 of an internal combustion engine 26. A V-belt 28 may be entrained on the pulley 20 and on a pulley 30 for the fan 12, and may also be entrained around a pulley 32 for a generator or the like as shown. A second accessory pulley 34 for a coolant pump or the like may also be driven from the pulley 20 by a drive belt 36. The coupling of the invention could be mounted as a separate unit within the scope of the invention, and driven by a belt from the crankshaft, but in the form shown it is adapted to act as a vibration damper for the crankshaft. In furtherance of this purpose, an engine balancing plate 38 is mounted on the crankshaft 24 by means of the sleeve 22. The balancing plate 38 is adjacent the engine 26 in the embodiment shown, and has a peripheral balance ring 37 mounted on the plate 38 by means of rivets 39, which may be used for engine timing marks.

An impeller 40 is fixedly secured by key means 42 on the outer end of the crankshaft 24 and a hollow shaft 44 is threadedly received in the crankshaft 24 as hereinafter described, having a head 45 which holds a washer 46 against the impeller hub. The impeller is disposed within the housing 18 and defines a plurality of equally spaced vanes 48 disposed in opposed registration with a corresponding plurality of turbine vanes 50. The turbine 16 and the impeller 40 also define mating cone-shaped clutch faces 52 and 54 respectively, and engagement thereof is afforded by relative axial movement between the turbine and the impeller.

In order to effect the engagement of the clutch faces 52 and 54, fluid from a source of pressure such as an oil pump P, shown schematically in FIGURE 7, is introduced into the housing 18 by means of an inlet conduit 56 in the crankshaft. The conduit 56 is continued through the shaft 44. The pulley 20 includes a plate 58 which is secured to an annular plate 60 of the housing by bolts 62, an O-ring 64 being provided in the boss 66 of the plate 60 for sealing purposes. The plate 60 defines a flange 68 which is bolted to a flange 70 on the turbine 16 by bolts 72, and an annular shelf 74 on the plate 60 extends beneath the flange 70 to engage an O-ring 77 in sealing relationship.

When fluid is introduced into the chamber 76 provided by the housing 18 (of which the plate 58 forms a part), and the impeller 40, the resulting pressure brings the coneﬁaced clutch elements 52 and 54 into wet friction engagement, increases in engine speed serving to increase pressure in the chamber 76 to maintain the clutch under increasing loads. A plurality of ball check valves 78 are disposed in the impeller 40 and are biased by springs 80 bearing against threaded elements 82 in the impeller to close against valve seats 83 defined by bores 84. When the speed of the engine attains a predetermined rate, the ball check valves are actuated centrifugally and by pressure from the chamber 76 to permit fluid to pass from passages 86 and 88 in the impeller into the fluid clutch provided by the vanes 48 and 50 in the impeller and turbine respectively.

In order to release fluid from the fluid clutch to the crankcase, as indicated in FIGURE 2, the sleeve 22 defines a helical channel 90 in its outer surface which co-operates with the hub 92 of the turbine 16 to provide a passage 94 leading from the fluid clutch to an annular passage 96 between the sleeve 22 and a reduced cap portion 98 of the balance plate 38. A sealing element 100 is disposed between the hub 92 and a somewhat enlarged portion 102 of the balance plate which includes an annular angle bracket 104 seating against a shoulder 106 on the sleeve. The end of the reduced portion 98 is turned radially inwardly at 108 to engage the end of the sleeve 22 and key 23 and a plurality of ports 109 are formed in the cap to permit fluid to pass from the annular passage 96 into the crankcase. The wall portion 110 of the crankcase may be disposed in sealing relation with the cap portion 98 by means of a resilient sealing member 112, which may be held within an outwardly and downwardly turned flange 114 of the wall 110, engaging a bracket 116 for the seal. As shown, a baffle plate 118 may also be mounted in abutting relation with the end 108 of the cap portion 98 and held against a bearing structure 120, to dissipate flow from the ports 109.

Although the differential area between the housing portions 50 and 60 and the opposed face of the turbine 16 maintains the clutch engagement at relatively low impeller speeds, opening of the ball check valves 78 as described serves to increase the pressure on the vaned portions of the turbine 16 and thus reduce the pressure on the mechanical clutch so that it slips and disengages. The resultant differential in the rate of angular rotation between the turbine 16 and the impeller 40 then effects a pumping and wiping action between the hub 92 of the turbine and the sleeve 22, so that fluid is positively propelled along the passage provided by the helical channel 90 in the sleeve. The amount of fluid introduced into the fluid clutch from the chamber 76 will then be controlled by the passages 86 and 88 so that a pressure condition will obtain in the fluid clutch such as to maintain a sufficient rate of rotation for the turbine and adequate power for the accessories, and when the speed of the engine is reduced the ball check valves 78 will again close to re-engage the mechanical clutch.

Referring now to FIGURE 3, a second embodiment of the invention is seen, wherein similar reference numerals designate similar parts, and which corresponds to the embodiment of FIGURE 2 except that the balance plate 122 is on the outer side of the coupling, away from the engine 26, and is not used for location of timing marks. Accordingly, fluid passes directly from the helical grooves 90 into the crankcase.

The balance plate 122 is keyed at 123 to an elongated shaft 124 which is threadedly engaged in the crankshaft 24 as described with respect to the shaft 44 in the embodiment of FIGURE 2. A nut 126 is threadedly engaged on the end of the shaft 124 to hold the balance plate or wheel 122 in axially fixed and proximate relationship to the pulley 128.

The pulley 128 is secured to a housing plate 130 by bolts or other suitable means 132 which are received in an annular boss 134 of the plate 130, the pulley having an annular shoulder 136 and an inwardly turned flange 138 seating on the boss 134. The plate 130 has a stepped configuration and provides an annular recess 140 for receiving a sealing means 142 which includes a bracket 144 supporting one side of an annular diaphragm 146 and a sealing ring 148 engaging the other side of the diaphragm. A spring 150 is interposed between the bracket 144 and the sealing ring 148 and bears against upstanding flanges of the diaphragm 146 to afford axial shifting of the housing. The sealing ring 148 in turn bears against a head 152 formed on the shaft 124 which engages a washer 154 and cooperates with the sleeve 22 in securing the impeller 40 in fixed relation to the crankshaft 24, as hereinbefore described.

In order to introduce fluid into the chamber 76a the shaft 124 defines a bore 153 which communicates with the bore 56 in the crankshaft 24. The bore 153 terminates just beyond the head 152 which has formed therein a plurality of radially extending passages 155 communicating with the bore 56 and with the chamber 76a so that the operation of the coupling corresponds to that of the preceding embodiment.

Referring now to FIGURE 4, another embodiment of the invention is shown corresponding generally to the embodiment of FIGURE 2 wherein similar parts are designated by similar reference numerals. In this embodiment, a double-faced impeller 156 is provided for coaction with a double-faced turbine 158. In driving some accessories, a relatively high degree of torque may be required, although a high rate of speed will be undesirable. To prevent excessive rates and loads on the accessories, the operation of the coupling of FIGURE 4 is similar to that previously described, with the ball check valves 78b controlling the operation of the mechanical clutch provided by the cone faces 52 and 54 so as to release the mechanical clutch at a predetermined speed and pressure condition. However, the impeller 156 defines a plurality of vanes 160 facing oppositely from the vanes 162 thereof and the housing 18b includes a plate 164 secured by bolts 68 to the turbine portion 16 and defining a plurality of turbine vanes 166 coacting with the vanes 160. Thus a second fluid clutch is provided in addition to the fluid clutch afforded by the vanes 162 and 50 of the impeller and turbine respectively. The plate 164 encloses the entire outer area of the chamber 76b and the chamber 76b encompasses fluid pressure acting within the second fluid clutch and the area of the cup-shaped portion 168 of the plate 164 to effect engagement of the mechanical clutch, as hereinbefore set forth. Thus when a predetermined engine speed and pressure condition is reached, the ball check valves 78b will open centrifugally to permit the mechanical clutch to disengage while maintaining a fluid clutch engagement in the first clutch provided by vanes 162 and 50 as controlled by the pumping and wiping action through the helical passage 90.

Referring now to FIGURE 5, yet another embodiment of the invention is shown, in which similar parts are referred to by similar reference numerals, and wherein metering means are provided for reducing the load carried by the engine in driving accessories at high speeds and preventing excessive rates of operation for the accessories. Thus an impeller 170 is keyed to the crankshaft 24 at 172 and held axially by a bolt 174 having a head 176 engaging a washer 178. A turbine 180 is slidably journalled on a sleeve 182 keyed to the shaft 24 at 184 which engages the impeller at its inner end as hereinbefore described. However, in this embodiment there is no provision for release of fluid between the turbine and the sleeve. The impeller 170 and the turbine 180 also define opposed vanes 186 and 188 and cone-shaped mechanical clutch faces 190 and 192, and axial passages 193 are formed in the impeller 170. A housing plate 194 is mounted on the turbine 180 by means of a snap ring 196 disposed in a recess 198 in the turbine flange 200 and a shoulder 202 in the said flange which receives an annular abutment 204 of the housing plate 194. The snap ring 196 has an outwardly turned end 206 which engages in an aperture 208 in the flange 200, and the other end 210 of the snap ring extends axially inwardly into engagement in an aperture 212 in the plate 194. The plate 194 is also provided with an O-ring 214 in sealing relationship with the flange 200. The housing plate 194 forms a relatively deep cup structure 216 whose bottom wall 218 threadedly receives a plug 220 having a threaded bore 222 in coaxial relationship with a threaded bore 224 in the bolt 174. The bore 224 communicates with the passage 56 in the crankshaft 24 and with the chamber 226 defined by the housing plate and the impeller.

In order to prevent excessive speeds from developing in the accessories and consequent overload on the engine, a needle valve element 228 is threadedly disposed in the bore 222, having a kerfed outer end 230 to permit adjustment of the axial position thereof. The needle valve has a contoured flow control tip 232 which is telescopically received in a valve sleeve 234 which is threaded into the bore 224. The relative difference in surface area between the plate 194 and the turbine vanes 188 will maintain the mechanical clutch in engagement until a predetermined torque effects slippage therebetween, whereupon the turbine will be driven at a relatively lower rate of angular rotation than the impeller. However, when there is a considerable pressure build up in the coupling, the fluid clutch means afforded by the vanes 186 and 188 may tend to drive the turbine at rates which approach the rate of the impeller more closely than desired, with the aforementioned hazard of excessive speed for the accessories. As engine speeds increase further, however, the rate of turbine rotation is maintained at appropriate levels by a relation between the pulley means 236 and the pulley means for the accessories, such as the pulley 30 shown in FIGURE 1, wherein the pulley means 236 is biased axially inwardly toward the engine so that the contoured tip 232 of the valve needle 228 carried by the plate 194 reduces the flow orifice in the valve sleeve 234 with a consequent reduction in the pressure in the fluid clutch during disengagement of the mechanical clutch.

The pulley means 236 may include a plurality of pulleys 238, 240 and 242 mounted on the cup-like structure 216 by means of bolts 243 extending through annular hubs 244, 246 and 248 for the pulleys into threaded engagement with an annular shoulder 250 on the structure 216.

A plurality of belts 252, 254 and 256 are entrained on the respective pulleys 238–242 and are inclined slightly toward the engine by the respective pulleys for the accessories driven thereby to effect the said biasing of the cone-faced clutch surfaces 190 and 192 toward disengaged relation. It will be understood that a similar biasing relationship may also be utilized with the other embodiments of the invention hereinbefore described.

There has thus been provided a fluid-mechanized clutch which is adapted to afford a controlled rate of operation for accessories which may be driven from an engine crankshaft, at both low and high engine speeds, and which positively prevents excessive rates of operation for the accessories and the resultant loss in engine efficiency while assuring adequate torque for driving the accessories.

Although I have herein set forth my invention with respect to certain specific principles and details thereof, it will be obvious to those skilled in the art that these may be varied without departing from the spirit and scope of the herewith appended claims.

I claim as my invention:

1. A coupling comprising an impeller, a turbine, means supporting said impeller and turbine for relative rotational and axial movement, clutch means defined by said impeller and said turbine including a mechanical clutch and a fluid clutch, means adapted to engage said fluid clutch means and to afford disengagement of said mechanical clutch means when the rate of angular rotation of said impeller and said turbine increase beyond a predetermined level and fluid control means for controlling fluid pressure in said coupling in accordance with the rate of angular rotation of said impeller.

2. A coupling comprising a shaft, a sleeve fixedly mounted on said shaft, a turbine slidably and rotatably mounted on said sleeve, an impeller fixedly mounted on said shaft, said turbine and said impeller defining mechanical and fluid clutch means, housing means for said coupling carried by said turbine, means adapted to engage said fluid clutch means and to afford disengagement of said mechanical clutch means when the rate of angular rotation of said shaft and said impeller and turbine increase beyond a predetermined level and fluid control means for controlling fluid pressure in said coupling in accordance with the rate of angular rotation of said shaft and said impeller.

3. A coupling comprising a shaft, a sleeve fixedly mounted on said shaft, a turbine slidably journaled on said sleeve, an impeller fixedly mounted on said shaft, clutch means defined by said turbine and said impeller including a mechanical clutch and a fluid clutch, means to afford disengagement of said mechanical clutch when the rate of angular rotation of said shaft and said impeller exceeds a predetermined level and pumping and wiping means defined by said turbine and said sleeve for controlling fluid pressure in said fluid clutch as a function of the differential rate of angular rotation between said turbine and said sleeve resulting from disengagement of said mechanical clutch.

4. In a coupling for driving vehicle accessories or the like, a shaft, a sleeve fixedly secured to said shaft defining a helical channel along the outer surface of said sleeve, a turbine having a hub slidably journalled on said sleeve in overlying relationship to said helical channel, and an impeller fixedly secured to said shaft, said turbine and said impeller defining a fluid clutch, said sleeve cooperating with said turbine to afford a pumping and wiping action which determines the level of fluid pressure in said fluid clutch as a function of the differential rate of rotation between said turbine and said sleeve.

5. In a coupling for driving vehicle accessories or the like, a shaft, a sleeve fixedly secured to said shaft and defining a helical channel around the outer surface of said sleeve, a turbine having a hub slidably journalled on said sleeve in overlying relationship to said helical channel, an impeller fixedly secured to said shaft, said turbine and said impeller defining a fluid clutch, and means including a conduit defined by said shaft for introducing fluid into said coupling, said sleeve cooperating with said turbine to afford a pumping and wiping action which determines the level of fluid pressure in said fluid clutch as a function of the differential rate of rotation between said turbine and said sleeve.

6. A coupling comprising a shaft, a turbine slidably journalled on said shaft, a housing structure carried by said turbine, an impeller fixedly secured to said shaft within said housing, said impeller and said turbine defining a mechanical clutch and a fluid clutch, means biasing said mechanical clutch to disengaged position in accordance with the rate of angular rotation of said shaft and metering valve means carried by said housing, said shaft defining a conduit for introducing fluid into said housing and said fluid clutch, said metering valve means controlling flow from said conduit as a function of the torque on said means.

7. In combination with an internal combustion engine having a crank shaft, a coupling comprising a turbine rotatably and slidably mounted on said crank shaft, an impeller fixedly secured to said crank shaft, a housing structure carried by said turbine, said turbine and said impeller defining a mechanical clutch and a fluid clutch, conduit means defined by said crank shaft for carrying fluid from a source in said engine to said housing, means for disengaging said mechanical clutch in response to a predetermined rate of angular rotation of said impeller and said crank shaft and a balance wheel carried by said crank shaft in proximate relation to said coupling, said balance wheel cooperating with said coupling in controlling the operation of said crank shaft.

8. In combination with an internal combustion engine having a crankshaft, a coupling comprising a turbine rotatably and slidably mounted on said crankshaft, an impeller fixedly secured to said crankshaft, a housing structure carried by said turbine, said turbine and said impeller defining a mechanical clutch and a fluid clutch, conduit means defined by said crankshaft for carrying fluid from a source in said engine to said housing, means for disengaging said mechanical clutch in response to a predetermined rate of angular rotation of said crankshaft, and a balance wheel carried by said crankshaft in proximate relation to said coupling with said coupling interposed between said balance wheel and said engine, said balance wheel cooperating with said coupling in stabilizing and damping said crankshaft.

9. In combination with an internal combustion engine having a crankshaft, a coupling comprising a turbine rotatably and slidably mounted on said crankshaft, an impeller fixedly secured to said crankshaft, a housing structure carried by said turbine, said turbine and said impeller defining a mechanical clutch and a fluid clutch, conduit means defined by said crankshaft for carrying fluid from a source in said engine to said housing, means for disengaging said mechanical clutch in response to a predetermined rate of angular rotation of said crankshaft, said crankshaft extending outwardly through said housing structure, sealing means for said housing and said crankshaft affording relative axial movement therebetween, and a balance wheel carried by said crankshaft at the outer end thereof and in proximate relation to said housing structure, said balance wheel cooperating with said coupling in stabilizing and damping said crankshaft.

10. A coupling comprising a shaft, a double faced impeller fixedly secured to said shaft, a turbine and housing structure slidably journalled on said shaft defining a turbine on each side of said impeller to afford two fluid clutches in cooperation with said impeller, a mechanical clutch defined by said turbine and housing structure and said impeller, means for introducing fluid into said turbine and housing structure and said fluid clutches and means controlling the flow of fluid into one of said fluid clutches and the engagement and disengagement of said mechanical clutch as a function of the rate of rotation of said shaft and said impeller.

11. A coupling comprising a shaft, a double faced impeller fixedly secured to said shaft, a turbine and housing structure slidably journalled on said shaft defining a turbine on each side of said impeller to afford two fluid clutches in cooperation with said impeller, a mechanical clutch defined by said turbine and housing structure and said impeller, means for introducing fluid into said turbine and housing structure and said fluid clutches, centrifugally actuated valve means in said impeller controlling the flow of fluid into one of said fluid clutches and the engagement and disengagement of said mechanical clutch and pumping and wiping means carried by said shaft and cooperating with said turbine and housing structure to control the rate of flow from said fluid clutches as a function of the differential rate of rotation between said turbine and housing structure and said shaft.

12. A coupling comprising a shaft, a double faced impeller fixedly secured to said shaft, a turbine and housing structure slidably journalled on said shaft defining a turbine on each side of said impeller to afford two fluid clutches in cooperation with said impeller, a mechanical clutch defined by said turbine and housing structure and said impeller, means for introducing fluid into said turbine and housing structure and said fluid clutches and centrifugally actuated valve means in said impeller controlling the flow of fluid into one of said fluid clutches.

13. In combination with an internal combustion engine having a crankshaft, a coupling comprising a turbine rotatably and slidably mounted on said crankshaft, an impeller fixedly secured to said crankshaft, a housing structure carried by said turbine, said turbine and said impeller defining a mechanical clutch and a fluid clutch, conduit means defined by said crankshaft for carrying fluid from a source in said engine to said housing, means for disengaging said mechanical clutch in response to a predetermined rate of angular rotation of said crankshaft, said crankshaft extending outwardly through said housing structure, and a balance wheel carried by said crankshaft at the outer end thereof and in proximate relation to said housing structure, said balance wheel cooperating with said coupling in stabilizing and damping said crankshaft.

14. In combination with an internal combustion engine having a crankshaft, a coupling comprising a turbine rotatably and slidably mounted on said crankshaft, an impeller fixedly secured to said crankshaft, a housing structure carried by said turbine, said turbine and said impeller defining a mechanical clutch and a fluid clutch, conduit means defined by said crankshaft for carrying fluid from a source in said engine to said housing, means for disengaging said mechanical clutch in response to a predetermined rate of angular rotation of said crankshaft, and a balance wheel having engine timing marks located thereon carried by said crankshaft in proximate relation to said engine and interposed between said housing and said engine, said balance wheel cooperating with said coupling in stabilizing and damping said crankshaft.

References Cited in the file of this patent

UNITED STATES PATENTS

| | | |
|---|---|---|
| 1,672,232 | Saives | June 5, 1928 |
| 2,101,606 | Ayres | Dec. 7, 1937 |
| 2,120,896 | Koeppen | June 14, 1938 |
| 2,860,519 | Cavanaugh | Nov. 18, 1958 |